Jan. 23, 1951

T. M. FERRILL, JR 2,538,772

AUTOMATIC VOLUME CONTROL SYSTEM

Filed April 20, 1943

INVENTOR
T. M. FERRILL, JR.
BY Herbert H. Thompson
ATTORNEY

Patented Jan. 23, 1951

2,538,772

UNITED STATES PATENT OFFICE 2,538,772

AUTOMATIC VOLUME CONTROL SYSTEM

Thomas M. Ferrill, Jr., Hempstead, N. Y., assignor to The Sperry Corporation, a corporation of Delaware Application April 20, 1943, Serial No. 483,819

3 Claims. (Cl. 250—20)

This invention relates to radio receivers and more especially to automatic volume control systems applied to radio receivers of the type used for instrument landing installations. The automatic volume control system of the present invention is especially adapted for use in the course softening system disclosed in my copending patent application Serial No. 478,013, filed March 4, 1943, now patent No. 2,439,044, granted April 6, 1948.

Although the general structural features and principles of operation of instrument landing receivers are markedly similar to superheterodyne receivers conventionally used for communication purposes, the requirements of the respective automatic volume control systems differ appreciably. Whereas in commercial and ordinary broadcast receivers a moderate increase in output signal strength may be tolerated for large increases in received signal amplitude, instrument landing receivers ordinarily require that the receiver output signal be held rigidly constant, or even that the output signal strength decrease with increased amplitude of input signal. It is essential, therefore, that receivers of the general type applied to instrument landing purposes be properly designed and carefully adjusted so that precise control of the output volume may be effected continuously and automatically.

It is customary to derive uni-directional volume control voltage as a function of the amplitude of the detected signal, and to apply the voltage obtained as a grid biasing potential to the input circuits of one or more amplifier stages, after cushioning the voltage against instantaneous changes at modulation frequencies. The uni-directional voltage, commonly known as the AVC voltage, thus varies according to fluctuations in the carrier strength of the incoming signal, and tends to render the receiver output independent of the strength of the input signal.

It is convenient and customary to derive the AVC voltage from the second detector output, but this practice presents difficulties in certain instances. Receivers of the type used in instrument landing systems ordinarily have relatively low input signal strength. Thus, in order for an AVC voltage of suitable amplitude to be derived from the output of the detector it is necessary for the input signal to be amplified to such a degree prior to detection that serious feedback disorders often are introduced.

Some attempts have been made to obviate the difficulty by decreasing the amplification prior to detection, while increasing the amplification in the audio stages following detection. With this arrangement, however, the amplitude of the rectified signal in the detector is insufficient to provide the rigid control necessary for instrument landing purposes, especially since extensive use is made in such receivers of variable-mu amplifier tubes, with the bias voltage range extending to 40 volts or more.

To render a weak rectified signal in the detector capable of properly controlling the volume, some attempts have been made to amplify the voltage by passing the rectified voltage through one or more stages of a direct current amplifier. This type of amplifier, however, is notoriously unstable in operation and it may produce variations in amplification as a result of shifts in the operating points, cathode temperatures, or supply voltage levels.

These difficulties have been overcome in the present invention by employing low signal level detection with its attendant advantages, and by deriving an AVC voltage of substantial proportions from one of the stages following detection. This result may be obtained by deriving an AVC voltage from the output of a triode grid power detector, or the signal from the first audio stage. The signal level accordingly is considerably amplified over the signal at the detector without resort to direct current amplifiers.

The principal objects of the present invention are: to provide an improved automatic volume control system for radio receivers; to provide a stable radio receiver having precise control of the output volume over a wide range of input signal levels; to provide a radio receiver automatic volume control whose effect increases with the input signal level; to provide an AVC voltage that varies as a function of the plate current characteristic of an audio-amplifier tube; and to provide a system generally for controlling the amplification of an alternating-current signal. These and other objects will become more apparent from the following description and from the accompanying drawings showing typical embodiments of the invention for purposes of illustration.

Generally speaking the invention comprehends restricting the output volume of a radio receiver by audio amplifying a detected radio signal and deriving a volume control signal from the amplified signal, specifically by deriving a slowly variable uni-directional voltage from the output of the audio amplifier.

Figure 1:
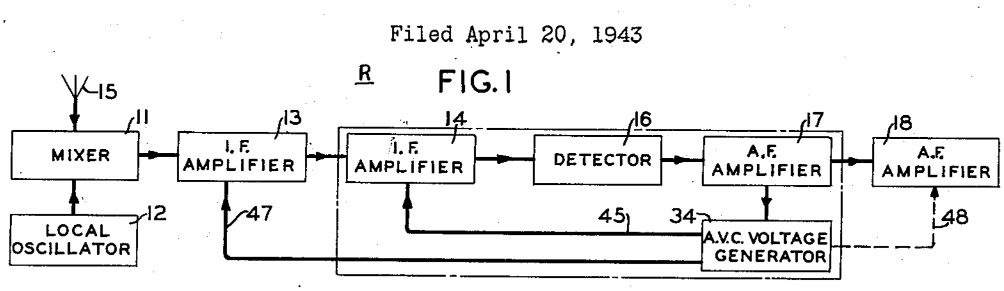
Fig. 1 is a block diagram of a superheterodyn receiver embodying principles of the present invention.
Figure 2:
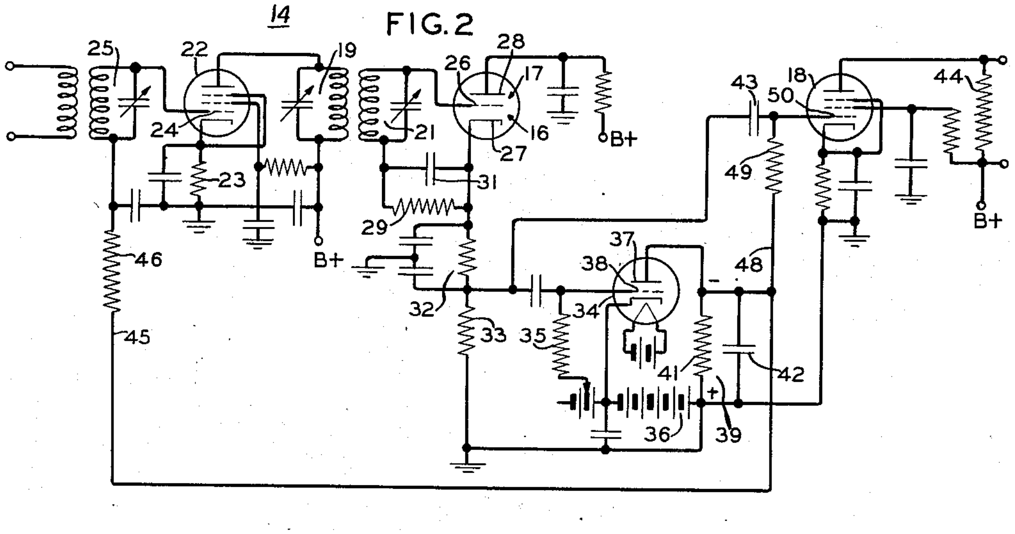
Fig. 2 is a wiring diagram of a portion of a receiver, e. g., a portion of the general type enclosed by broken lines in Fig. 1.

Although the invention may be applied generally to the control of the amplitude of alternating-current signals, the invention has been disclosed herein specifically as applied to a radio receiver. In Figs. 1 and 2, such a receiver R may comprise receiving and radio frequency amplifying means applied in conventional circuits, for example, a mixer 11, a local oscillator 12, and one or more stages of intermediate frequency amplification 13 and 14, by which signals from antenna 15 may be amplified before they arrive at the detector 16. One or more stages of audio frequency amplification 17 and 18 may be used to amplify the signals from the detector 16.

The manner of connecting the various circuit components and the means utilized for obtaining the AVC voltage may be more apparent from a consideration of Fig. 2, which shows the last stage of intermediate frequency amplification 14 coupled in a conventional manner to the detector 16 as by means of tuned resonant circuits 19 and 21. The amplifier stage 14 may utilize a pentode tube 22 having its grid 24 normally self-biased by means of resistor 23. Additional AVC biasing voltage may be applied to the grid through the coil of the resonant input circuit 25, in a manner to be described.

The detector 16 may be of any design customarily used for rectifying the input signal, or for deriving an AVC voltage therefrom. A triode, however, is preferred for the purpose because it permits diode detection between grid 26 and cathode 27 while in the same stage providing substantial amplification in the circuit of anode 28. A grid-leak 29 of the order of several hundred thousand ohms cooperates with a grid-leak condenser 31 of the order of one hundred micro-microfarads, to provide the desired time constant, all in accordance with standard practice. The changing potentials on grid 26, produced by the applied signal, control the flow of plate current according to the mutual characteristics of the tube. Radio-frequency components are suitably by-passed as by a filter 32, and an audio-frequency output voltage is produced across a load impedance such as a resistor 33, through which the plate current flows to ground. Since the voltage produced across impedance 33 is considerably higher than the signal voltage in the input circuit, the output voltage may be rectified to produce an AVC voltage of appreciable amplitude.

The amplified signal may be applied to the input circuit of an AVC voltage generator 34 comprising a thermionic tube adapted to derive a uni-directional voltage as a function of the input signal. The generator 34 may comprise a triode with fixed bias applied through grid resistor 35. A plate voltage supply 36 provides a potential for the anode 37, producing a flow of current through the tube in accordance with the signal voltage impressed on grid 38. A load circuit 39, comprising a resistor 41 and condenser 42, having a long time constant, develops an AVC voltage in accordance with the plate current pulses. Under a typical operating condition the load circuit 39 comprises a one-megohm resistor and a one-microfarad condenser, the combination having a time constant of one second. The voltage developed across the circuit 39 comprises a substantially constant potential and uni-directional voltage for a given audio-frequency detected modulation level. A specific example of operation will be considered in connection with the description of Fig. 3.

The output of the triode detector or first audio stage appearing across impedance 33 is applied to audio amplifier 18 through the usual coupling condenser 43. The amplifier 18 comprises a conventional pentode resistance-coupled amplifier having an output load 44.

The AVC voltage developed across resistor 41 and condenser 42 may be applied to the grid circuits of one or more of the amplifier stages. In Fig. 2 a negative voltage relative to ground is shown applied through wire 45 and resistor 46 to the grid 24 of the intermediate frequency amplifier tube 22. Control of additional radio-frequency amplifier stages may be effected as by means of wire 47 of Fig. 1. The AVC voltage may be applied to the control grid 50 of amplifier 18 through wire 48 and resistor 49. The degree of control exerted by the AVC voltage is a function of the number of stages to which the control is applied. Although the AVC generator in Fig. 1 is illustrated as being controlled by the first audio-frequency amplifier, whereas in Fig. 2 it is shown controlled by the detector tube output circuit, it will be appreciated that the detector 16 in Fig. 2 comprises in effect a diode rectifier and a single stage of audio amplification, so that in either case use is made of a signal that is amplified following detection.

Figure 3:
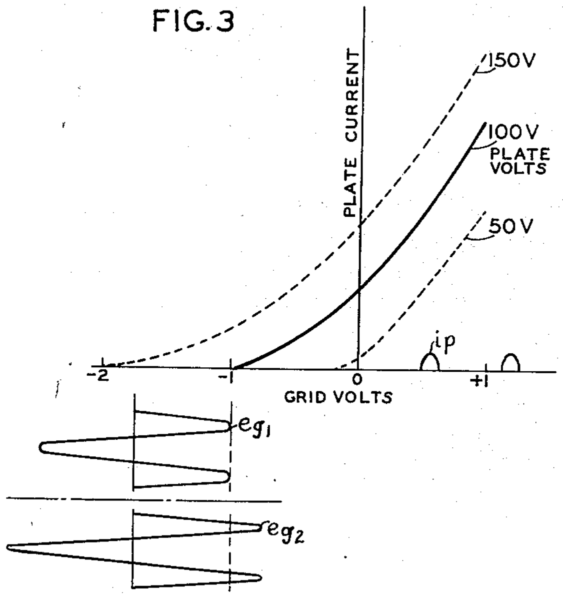
Fig. 3 is a graph of the mutual characteristics of the tube utilized to obtain AVC control according to the present invention.

Fig. 3 illustrates typical operating conditions for different plate voltages with varying grid voltages applied to the generator 34. Similar results are obtainable with various degrees of fixed grid bias, provided the application of an input signal of predetermined magnitude results in an increase in plate current. The grid bias may be adjusted so as to provide no volume control action until a signal of predetermined amplitude is applied, e. g. until the signal reaches a normal operating level. As shown in Fig. 3, plate current at a hundred volts anode potential may be cut off with a grid bias of one volt; hence a grid voltage $e_{g1}$ having a swing of 0.75 volt from its neutral axis has no effect on the plate current if the tube is biased at 1.75 volts as shown. Plate current pulses $i_p$ may be made to flow by applying a grid signal $e_{g2}$ in excess of 0.75 volt as shown in Fig. 3.

Figure 4:
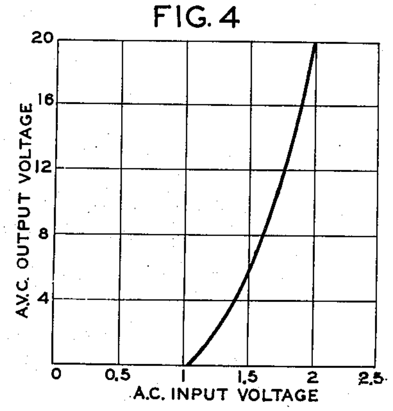
Fig. 4 is a graph depicting the relation between the A. C. input voltage and the AVC control voltage.

Fig. 4 illustrates a typical circuit condition for the generator 34 with AVC voltage plotted as ordinates against input signal voltage as abscissae. By control of the grid bias potential the threshold of the AVC operation has been adjusted so as to obtain no control action until the input signal exceeds one volt amplitude.

Where in this specification and the appended claims the expression "instrument landing receiver" is used, reference is made to a receiver to be carried in an aircraft and adapted to indicate the displacement of the craft with respect to a directive radio energy pattern which is fixed in space and which defines a landing path for the craft.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A method of restricting the volume of a radio receiver having radio-frequency and audio-frequency amplifier means, comprising detecting the modulation envelope of a modulated radio-frequency carrier to reproduce a modulation signal, amplifying said modulation signal, deriving a control voltage from said amplified modulation signal, and biasing said radio-frequency and said audio-frequency amplifier means in response to said control voltage so as to reduce the gain of said receiver as said control voltage increases.

2. A volume-controlled radio receiver, comprising radio-frequency amplifier means, a detector, audio amplifier means, means connected with the output of a stage of said audio amplifier means for deriving a unidirectional output voltage therefrom, and means for applying said unidirectional output voltage as negative bias to said radio-frequency amplifier means and at least one stage of said audio amplifier means, thereby to decrease the gain of both said amplifier means as the audio output increases.

3. A modulated-wave receiver, comprising a detector, alternating current amplifier means including at least one stage each of high-frequency and audio-frequency amplification, means energized by the amplified audio signal from one of said audio-frequency stages and adapted to produce a uni-directional voltage whose strength increases with the amplitude of said audio signal, and means for reducing the gain of at least one of said high-frequency amplifier stages and at least one of said audio frequency amplifier stages throughout the operating range of the receiver in response to said uni-directional voltage.

THOMAS M. FERRILL, Jr.

REFERENCES CITED

The following references are of record in the file of this patent:

UNITED STATES PATENTS

| Number | Name | Date |
|---|---|---|
| Re. 21,014 | Beers | Feb. 28, 1939 |
| 1,808,538 | Gabriel et al. | June 2, 1931 |
| 1,884,680 | Hentschel | Oct. 25, 1932 |
| 1,916,129 | Schade | June 27, 1933 |
| 1,950,145 | Hentschel | Mar. 6, 1934 |
| 2,010,014 | Elliott | Aug. 6, 1935 |
| 2,013,121 | Wheeler | Sept. 3, 1935 |
| 2,013,297 | Black | Sept. 3, 1935 |
| 2,017,020 | Seeley | Oct. 8, 1935 |
| 2,061,710 | McCaa et al. | Nov. 24, 1936 |
| 2,112,279 | Hagenhaus | Mar. 29, 1938 |
| 2,200,037 | Mountjoy et al. | May 7, 1940 |
| 2,207,905 | Weagant | July 16, 1940 |
| 2,214,613 | Herold | Sept. 10, 1940 |
| 2,244,695 | Hathaway | June 10, 1941 |
| 2,248,783 | Rinia et al. | July 8, 1941 |
| 2,259,906 | Neustadt | Oct. 21, 1941 |
| 2,282,377 | Place | May 12, 1942 |
| 2,385,212 | Konrad | Sept. 18, 1945 |

FOREIGN PATENTS

| Number | Country | Date |
|---|---|---|
| 496,217 | Great Britain | Nov. 25, 1938 |